(12) United States Patent
Jariwala et al.

(10) Patent No.: US 6,482,911 B1
(45) Date of Patent: Nov. 19, 2002

(54) FLUOROALKYL POLYMERS CONTAINING A CATIONOGENIC SEGMENT

(75) Inventors: Chetan P. Jariwala, Woodbury, MN (US); Linda G. Cote, Woodbury, MN (US); Deborah J. Eilers, Hastings, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/850,699

(22) Filed: May 8, 2001

(51) Int. Cl.[7] ............................................. C08F 118/00
(52) U.S. Cl. ...................... 526/245; 526/243; 526/246; 526/248; 526/253; 526/304; 526/307.3; 526/307.5; 526/307.7; 526/312; 526/320; 526/325; 526/329.4; 526/329.6; 526/333
(58) Field of Search .................................. 526/243, 245, 526/246, 248, 253, 304, 307.3, 307.5, 307.7, 312, 320, 325, 329.4, 329.6, 333

(56) References Cited

U.S. PATENT DOCUMENTS

| | | |
|---|---|---|
| 2,803,615 A | 8/1957 | Ahlbrecht et al. |
| 3,458,348 A * | 7/1969 | Sherman .................. 117/138.8 |
| 3,574,791 A | 4/1971 | Sherman et al. |
| 3,646,085 A | 2/1972 | Bartlett |
| 3,728,151 A | 4/1973 | Sherman et al. |
| 3,810,874 A | 5/1974 | Mitsch et al. |
| 3,810,876 A | 5/1974 | Cowell et al. |
| 3,816,167 A | 6/1974 | Schultz et al. |
| 3,920,614 A | 11/1975 | Kirimoto et al. |
| 3,944,527 A | 3/1976 | McCown |
| 3,950,588 A | 4/1976 | McDougal |
| 4,127,711 A | 11/1978 | Lore et al. |
| 4,295,976 A | 10/1981 | Dessaint et al. |
| 4,504,401 A | 3/1985 | Matsuo et al. |
| 4,564,561 A | 1/1986 | Lore et al. |
| 4,624,889 A | 11/1986 | Bries |
| 4,859,754 A | 8/1989 | Maekawa et al. |
| 5,068,135 A | 11/1991 | Zavatteri et al. |
| 5,276,175 A | 1/1994 | Dams et al. |
| 5,350,795 A | 9/1994 | Smith et al. |
| 5,410,073 A | 4/1995 | Kirchner |
| 5,411,766 A | 5/1995 | Kirchner |
| 5,453,540 A | 9/1995 | Dams et al. |
| 5,509,939 A | 4/1996 | Kirchner |
| 5,560,992 A | 10/1996 | Sargent et al. |
| 5,574,791 A | 11/1996 | Orban |
| 5,659,618 A | 8/1997 | Takahashi et al. |
| 5,789,513 A | 8/1998 | Kirchner |
| 5,847,134 A | 12/1998 | May |
| 5,851,674 A | 12/1998 | Pellerite et al. |
| 5,910,557 A | 6/1999 | Audenaert et al. |
| 6,156,860 A * | 12/2000 | Tanaka et al. ............... 526/245 |

FOREIGN PATENT DOCUMENTS

| | | |
|---|---|---|
| DE | 2406781 A | 8/1975 |
| EP | 0 271 027 B1 | 6/1988 |
| EP | 0 433 070 B1 | 6/1991 |
| EP | 0 789 050 A2 | 8/1997 |
| EP | 0 933 377 A2 | 8/1999 |
| FR | 2785904 | 5/2000 |
| JP | 60-152585 | 1/1984 |
| JP | 3220284 | 1/1990 |
| JP | 11-49825 | 8/1997 |
| JP | 11-310685 | 4/1998 |
| WO | WO 98/50619 | 11/1998 |
| WO | WO 98/51727 | 11/1998 |
| WO | WO 99/37720 | 7/1999 |

OTHER PUBLICATIONS

H. C. Fielding, "*Organofluorine Surfactants and Textile Chemicals*", R. E. Banks, Ed., Society of Chemical Industry, pp. 214–234, (1979).

C. J. Brinker, "*Hydrolysis and Condensation of Silicates: Effects on Structure*" Journal of Non–Crystalline Solids 100, pp. 31–50.

* cited by examiner

*Primary Examiner*—Helen L. Pezzuto
(74) *Attorney, Agent, or Firm*—Kent S. Kokko

(57) ABSTRACT

Fluorochemical polymers for use in providing stain-release properties to a substrate material are disclosed. The present invention provides for polymeric fluorochemical polymers that include perfluoroaliphatic, hydrophilic, cationogenic, and either N-hydroxyalkylacrylamide and/or diacrylate monomers.

56 Claims, No Drawings

FLUOROALKYL POLYMERS CONTAINING A CATIONOGENIC SEGMENT

FIELD OF THE INVENTION

This invention relates to fluorochemical polymers for use in providing stain release properties to a substrate material. In another aspect, this invention relates to fluorochemical polymers that contain pendant fluoroaliphatic and cationogenic groups. This invention also relates to fluorochemical polymers with improved stain release durability when applied to a substrate material.

BACKGROUND OF THE INVENTION

The treatment or modification of fabrics to improve their properties is routine practice in the textile industry. Fabrics can be treated to reduce their oleophilicity and facilitate stain release during laundering. Such treatments include fluorochemical-based polymers containing both fluorinated oleophobic and non-fluorinated hydrophilic fractions.

Fluorochemicals include substances containing portions which are fluorocarbon in nature and portions which are organic hydrocarbon in nature. Such fluorochemicals are common and have various industrial uses including reducing the surface tension of liquids, reducing evaporation and flammability of volatile organic liquids, and improving the leveling of organic polymer coatings.

The utility of organofluorine compounds as surface-active agents and surface-treating agents is due in large part to the extremely low free-surface energy of a $C_6$–$C_{12}$ fluorocarbon group, according to H. C. Fielding, "Organofluorine Compounds and Their Applications" R. E. Banks, Ed., Society of Chemical Industry at p. 214 (1979).

SUMMARY OF THE INVENTION

Generally, the present invention relates to fluorochemical polymers for use in providing stain release properties to a substrate material. One embodiment is a polymer that includes, i) a perfluoroaliphatic monomer of the formula

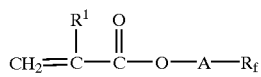

where $R_f$ is a $C_1$–$C_{20}$ perfluorinated group, A is divalent linking group,

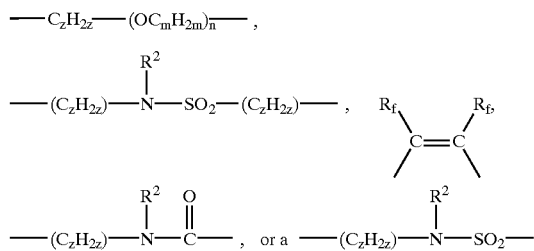

group, z is 1 to 12, m is 1 to 6, n is 1 to 12, $R^1$ is H or $CH_3$—, and $R^2$ is H, $CH_3$— or $C_2H_5$—; ii) a hydrophilic monomer of the formula

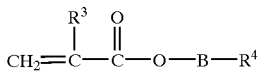

where B is a divalent linking group, $R^3$ is H or $CH_3$, p is 1 to 25, $R^4$ is $C_1$–$C_{12}$ alkyl, aryl, aralkyl or alkaryl; iii) a cationogenic monomer of the formula

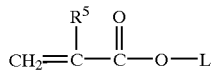

where L is —$(C_qH_{2q})$—Y, and salts thereof, i.e. —$(C_qH_{2q}q)$—$Y^+$ $X^-$ q is 1 to 8, Y is a cationogenic group, $X^-$ is an anion, $R^5$ is H or $CH_3$—, and $R^6$ and $R^7$ are independently $C_1$–$C_{12}$ alkyl or $C_1$–$C_2$ hydroxyalkyl; and iv) a N-hydroxyalkylacrylamide monomer of the formula

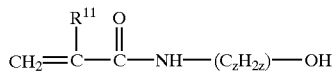

where z is 1 to 12, and $R^{11}$ is H or $CH_3$—; and/or v) a diacrylate monomer of the formula

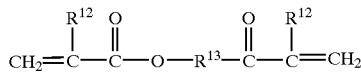

where $R^{12}$ is H or $CH_3$—, and $R^{13}$ includes —$(CH_2CH_2O)_p$—, where p is 1 to 25.

An embodiment of the present invention includes polymers described above where monomer (i) is present in the amount of 20 to 70 percent by weight, monomer (ii) is present in the amount of 25 to 60 percent by weight, monomer (iii) is present in the amount of 1 to 20 percent by weight, and monomer (iv) is present in the amount of 1 to 10 percent by weight.

Another embodiment of the present invention includes polymers described above where monomer (i) is present in the amount of 45 to 70 percent by weight, monomer (ii) is present in the amount of 25 to 50 percent by weight, monomer (iii) is present in the amount of 1 to 10 percent by weight, and monomer (iv) is present in the amount of 1 to 8 percent by weight.

A further embodiment of the present invention includes polymers described above where monomer (i) is present in the amount of 50 to 65 percent by weight, monomer (ii) is present in the amount of 35 to 40 percent by weight, monomer (iii) is present in the amount of 1 to 5 percent by weight, and monomer (iv) is present in the amount of 1 to 5 percent by weight.

An embodiment of the present invention includes polymers described above where monomer (i) is present in the amount of 20 to 70 percent by weight, monomer (ii) is present in the amount of 25 to 60 percent by weight, monomer (iii) is present in the amount of 1 to 20 percent by weight, and monomer (v) is present in the amount of 0.001 to 5 percent by weight.

In an additional embodiment, monomer (i) is present in the amount of 45 to 65 percent by weight, monomer (ii) is present in the amount of 30 to 50 percent by weight, monomer (iii) is present in the amount of 1 to 10 percent by weight, and monomer (v) is present in the amount of 0.01 to 2 percent by weight.

In yet a further embodiment, monomer (i) is present in the amount of 50 to 60 percent by weight, monomer (ii) is present in the amount of 35 to 45 percent by weight, monomer (iii) is present in the amount of 1 to 5 percent by weight, and monomer (v) is present in the amount of 0.1 to 1 to percent by weight.

Yet another embodiment, of the present invention includes a composition for imparting oil, water and stain repellency and stain-release properties to a substrate including an aqueous, substantially organic solvent free, solution or dispersion of the polymers described above.

Advantageously, the polymers of the present invention may be applied to substrates, such as textiles, to provide stain resistance, stain release and or oil-repellency without the use of other common textile additives such as permanent press resins, and the like. However, such additives may be added where desired. Such additives may be admixed with the polymers of the invention and applied to the substrate, or may be applied separately.

An additional advantage of the present invention is that aqueous solutions of the polymers described herein maintain a water-like viscosity characteristic which allows the materials to be conveniently handled and transferred even at wt solids at or above 15%. This allows for more efficient conveyance of polymer solutions, since a higher percent solids aqueous formulation necessarily requires the transportation of less water.

The above summary of the present invention is not intended to describe each disclosed embodiment or every implementation of the present invention. As used herein, the term polymer shall be inclusive of oligomers. The detailed description which follows more particularly exemplifies these embodiments.

DETAILED DESCRIPTION OF THE PREFERRED EMBODIMENT

The present invention is believed to be applicable to fluorochemical polymers for use in providing stain-resistant and/or stain-release properties to a substrate material. In particular, the present invention is directed to fluorochemical polymers that contain pendant fluoroaliphatic and cationogenic groups. While the present invention is not so limited, an appreciation of various aspects of the invention will be gained through a discussion of the examples provided below.

It is to be understood that the recitation of numerical ranges by endpoints includes all numbers and fractions subsumed within that range (e.g. 1 to 5 includes 1, 1.5, 2, 2.75, 3, 3.80, 4, and 5).

It is to be understood that all numbers and fractions thereof are presumed to be modified by the term "about."

It is to be understood that "a" as used herein includes both the singular and plural.

The general definitions used herein have the following meanings within the scope of the present invention.

The term "alkyl" refers to straight or branched hydrocarbon radicals, such as methyl, ethyl, propyl, butyl, octyl, isopropyl, tert-butyl, sec-pentyl, and the like. Alkyl groups can either be unsubstituted or substituted with one or more substituents, e.g., halogen, alkoxy, aryl, arylalkyl, aralkoxy and the like. Alkyl groups include, for example, 1 to 12 carbon atoms, 1 to 8 carbon atoms, or 1 to 6 carbon atoms.

The term "alkenyl" refers to straight or branched unsaturated hydrocarbon radicals having one or more double bonds, such as ethylene, propylene, butylene, 1,3-pentadiene, 1,4-pentadiene, and the like. Alkenyl groups can either be unsubstituted or substituted with one or more substituents, e.g., haloalkyl, halogen, alkoxy, aryl, arylalkyl, aralkoxy and the like. Alkenyl groups include, for example, 2 to 12 carbon atoms, or 2 to 9 carbon atoms.

The term "alkylene" refers to a divalent straight or branched saturated hydrocarbon radical such as, for example, —$CH_2$—, —$CH_2CH_2$—, —$CH_2CH_2CH_2$—, —$CH_2CH_2CH(CH_3)CH2$—, —$CH_2CH(CH_2CH_3)CH_2CH(CH_3)CH2$—, and the like. Alkylene groups include, for example, 1 to 20, 1 to 12, or 1 to 4 carbon atoms.

The term "halo" refers to fluoride, chloride, bromide, and iodide radicals.

The term "haloalkyl" refers to an alkyl group substituted with a halo radical as defined above.

The term "hydroxyalkyl" refers to an alkyl group as defined above substituted with a hydroxyl moiety.

The term "aryl" refers to monovalent unsaturated aromatic carbocyclic radicals having a single ring, such as phenyl, or multiple condensed rings, such as naphthyl or anthryl, which can be optionally substituted by substituents such as halogen, alkyl, arylalkyl, alkoxy, aralkoxy, and the like.

The term "alkoxy" refers to -O-alkyl with alkyl as defined above. Alkoxy groups include, for example, methoxy, ethoxy, propoxy, isopropoxy, and the like.

The term "aralkyl" refers to an aryl radical defined as above substituted with an alkyl radical as defined above (e.g. aryl-alkyl-). Aralkyl groups include, for example, phenethyl, benzyl, and naphthethyl.

The term "alkaryl" refers to an alkyl radical defined as above bonded to an aryl radical as defined above (e.g. alkyl-aryl-).

The term "aralkylene" refers to an aryl radical defined as above substituted with an alkylene radical as defined above, thus producing a divalent moiety (e.g. -aryl-alkyl-). Aralkylene groups include, for example, phenethyl, benzyl, and naphthethyl.

The term "alkaryl" refers to an alkyl radical defined as above bonded to an aryl radical as defined above thus producing a divalent moiety (e.g. -alkyl-aryl-).

The term "weight percent" refers to the percent by mass of an individual component in a total system. For example, the weight percent of an individual monomer in a polymer is the mass of the individual monomer divided by the mass of the total polymers multipled by 100.

$R_f$ is a perfluorinated aromatic or aliphatic group containing at least one carbon atom. Where the radical contains a plurality of carbon atoms in a skeletal chain, such chain may be linear, branched, acyclic, cyclic, saturated or unsaturated. The skeletal chain of carbon atoms can be interrupted by heteroatoms, such as divalent oxygen or trivalent nitrogen atoms each of which is bonded only to carbon atoms, or hexavalent sulfur atoms each of which may be bonded to carbon, fluorine, or oxygen atoms, but preferably where such heteroatoms are present, such skeletal chain does not contain more than one said heteromoiety for every two carbon atoms.

The total number of carbon atoms in $R_f$ can vary and be, for example, 1 to 20, preferably 1 to 8, and more preferably 1 to 4. Where $R_f$ is or contains a cyclic structure, such structure preferably has 5 or 6 ring members, one or two of which can be said heteroatoms, e.g., oxygen and/or nitrogen. Where two or more $R_f$ groups occur in a single formula, they can be the same or different and may be linked together to form a cyclic structure.

The term "cationogenic" refers to nonionic substituents capable of forming cations. Cationogenic groups include pyridinium ion, phosphonium ion, sulfonium ion, radicals of quaternary ammonium salts or cation generating amines, which include alkyl-substituted amines, amine oxides and oxygen-free amines such as, for example, —$NH_2$.

The term "substantially organic solvent free" refers to a solution containing less that 30% of an organic solvent.

The term "substrate" refers to any structural surface to which a solution may be applied such as, for example, textiles, paper, wood, leather, natural or synthetic fibers, and films.

The present invention provides for polymeric fluorochemical polymers that include perfluoroaliphatic, hydrophilic, cationogenic, and N-hydroxyalkylacrylamide and/or diacrylate monomers. Preferably the polymers comprise N-hydroxyalkylacrylamide or diacrylate monomers.

Perfluoroaliphatic Monomers

Perfluorinated monomers of the present invention include, for example, esters of the formula I

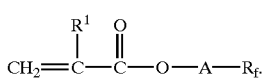

(I)

$$CH_2=\overset{R^1}{\underset{|}{C}}-\overset{O}{\underset{\|}{C}}-O-A-R_f.$$

With reference to Formula I, $R_f$ designates a perfluoroaliphatic group. The polymeric fluorochemical polymers of the invention contain a plurality of pendent $R_f$ groups (e.g. from 4 to 10) and contain from 5 percent to 80 percent fluorine by weight, based on the total weight of the polymer, the loci of the fluorine being essentially in the $R_f$ groups. Additionally, polymeric fluorochemical polymers of the invention can include, for example, from 10 percent to 70 percent, 20 percent to 65 percent, or 30 percent to 60 percent fluorine by weight, based on the total weight of the polymer, the loci of the fluorine being essentially in the $R_f$ groups. Each $R_f$ is a stable, inert, non-polar, preferably saturated, monovalent moiety which is both oleophobic and hydrophobic. $R_f$ contains, for example, at least 1 carbon atom. $R_f$ can include, for example from 1 to 20 carbon atoms, 1 to 12 carbon atoms, 1 to 8 carbon atoms, 3 to 8 carbon atoms, or 3 to 6 carbon atoms. Additionally, the terminal portion of the $R_f$ group contains a fully fluorinated terminal group such as, for example, $CF_3CF_2CF_2$—, $(CF_3)_2CF$—, or the like. For example, $R_f$ is a $C_3$–$C_4$ perfluoroalkyl moiety such as a $C_4$ perfluoroalky moiety.

With reference to Formula I, "A" is a moiety that links the $R_f$ groups to the acrylate group of a perfluoroaliphatic monomer. "A" includes, for example, from 1 to 20 carbon atoms and can optionally include caternary oxygen, nitrogen, sulfur, or silicon-containing groups or a combination thereof. Examples of A groups include, for example, a covalent bond, straight, branched or cyclic alkylene groups, arylene, alkarylene, aralkylene, oxy, oxo, thio, sulfonyl, sulfonyloxy, amino, imino, sulfonamido, carboxamido, carbonyloxy, urethanylene, urylene groups, and combinations thereof such as sulfonamidoalkylene groups. "A" includes, for example, a $C_1$–$C_{20}$ alkylene, —$C_zH_{2z}$—$(OC_mH_{2m})_n$—,

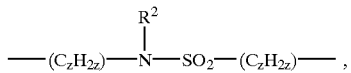

$$—(C_zH_{2z})—\overset{R^2}{\underset{|}{N}}—SO_2—(C_zH_{2z})—,$$

-continued $$—(C_zH_{2z})—\overset{R^2}{\underset{|}{N}}—\overset{O}{\underset{\|}{C}}—, \quad \overset{R_f}{\underset{/}{\phantom{C}}}C=C\overset{R_f}{\underset{\backslash}{\phantom{C}}}\text{ or a}$$

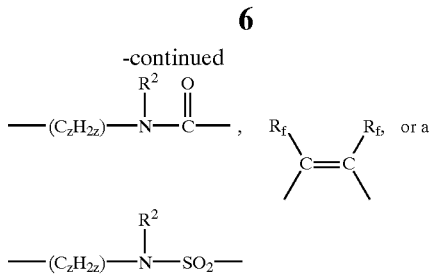

$$—(C_zH_{2z})—\overset{R^2}{\underset{|}{N}}—SO_2—$$

group, each z is independently 1 to 20, m is 1 to 6, and n is 1 to 12. In an additional example, A includes a $C_2$–$C_6$ alkylene or $$—(C_zH_{2z})—\overset{R^2}{\underset{|}{N}}—SO_2—$$

group where z is 1 to 6. In a further example, A includes a $C_2$–$C_4$ alkylene group, for example —$CH_2CH_2$—, or a $$—(C_zH_{2z})—\overset{R^2}{\underset{|}{N}}—SO_2—$$

group where z is 2.

With reference to Formula I, $R^1$ and $R^2$ include, for example, hydrogen or $C_1$–$C_{12}$ alkyl. In an additional example, $R^1$ and $R^2$ include hydrogen or $C_1$–$C_4$ alkyl. In a further example, $R^1$ includes hydrogen or $CH_3$— and $R^2$ includes hydrogen, $CH_3$— or $CH_3CH_2$—.

Examples of perfluoroaliphatic monomers include the following:

TELOMER-A—(FLUOWET™-AC-812) ($CH_2$=CHC(O)$OCH_2CH_2(CF_2)_nCF_3$, where n is a value ranging from 3 to 20 and averaging 8;
(FLUOWET™-AC-600) ($C_6F_{13}C_2H_4OC(O)CH$=$CH_2$)
—$C_2F_5C_6F_{10}CH_2OC(O)CH$=$CH_2$;
—$C_7F_{15}CH_2OC(O)CH$=$CH_2$;
—$C_7F_{15}CON(CH_3)C_2H_4OC(O)CH$=$CH_2$;
MeFOSEA —$C_8F_{17}SO_2N(CH_3)C_2H_4OC(O)CH$=$CH_2$;
EtFOSEA —$C_8F_{17}SO_2N(C_2H_5)C_2H_4OC(O)CH$=$CH_2$;
Me FHSEA —$C_6F_{13}SO_2N(CH_3)C_2H_4OC(O)CH$=$CH_2$;
MeFBSEMA —$C_4F_9SO_2N(CH_3)C_2H_4OC(O)C(CH_3)$=$CH_2$;
MeFBSEA —$C_4F_9SO_2N(CH_3)CH_2CH_2OC(O)CH$=$CH_2$;
MeFOSEMA —$C_8F_{17}SO_2N(CH_3)C_2H_4OC(O)C(CH_3)$=$CH_2$, and.
HFP Trimer [$(CF_3)_2CF]_2C$=$CHCF(CF_3)_2$.

Hydrophilic Monomers

Hydrophilic monomers of the present invention include, for example, acrylate esters of the formula II (II)

$$CH_2=\overset{R^3}{\underset{|}{C}}-\overset{O}{\underset{\|}{C}}-O-B-R^4.$$

With reference to Formula II, $R^4$ includes, for example, $C_1$–$C_{12}$ alkyl, aryl, aralkyl, and alkaryl groups. In an additional example, $R^4$ includes a $C_1$–$C_8$ alkyl or $C_1$–$C_8$ alkoxy group. In a further example, $R^4$ includes a $C_1$ alkyl or $C_1$ alkoxy group.

With reference to Formula II, B is typically a moiety that links $R^4$ to the acrylate group. B includes linking groups that may be a covalent bond, alkylene, or a group that can result from the condensation reaction of a nucleophile such as an alcohol, an amine, or a thiol with an electrophile, such as an ester, acid halide, isocyanate, sulfonyl halide, sulfonyl ester, or may result from a displacement reaction between a nucleophile and a leaving group. B contains, for example from 1 to 20 carbon atoms and can optionally contain catemary oxygen, nitrogen, sulfur, or silicon-containing groups or a combination thereof. B is preferably free of functional groups that substantially interfere with free-radical oligomerization (e.g. polymerizable olefinic double bonds, thiols, easily abstracted hydrogen atoms such as cumyl hydrogens, and other such functionality known to those skilled in the art). Examples of B groups include, for example, straight, branched or cyclic alkylene groups, arylene, alkarylene, aralkylene, oxy, oxo, thio, sulfonyl, sulfonyloxy, amino, imino, sulfonamido, carboxamido, carbonyloxy, urethanylene, urylene groups, and combinations thereof such as oxyethylene groups. B includes, for example, $—(CH_2CH_2O)_p—$, where p is 1 to 25. In an additional example, B includes $—(CH_2CH_2O)_p—$, where p is 10 to 20. In a further example, B includes $—(CH_2CH_2O)_p—$, where p is 17.

With reference to Formula II, $R^3$ includes, for example, hydrogen or $CH_3—$.

Examples of hydrophillic monomers include the following:

CW-750A  $—CH_3O(CH_2CH_2O)_nC(O)CH=CH_2$; where $n_{avg}=16$

CW-450A  $—CH_3O(CH_2CH_2O)_nC(O)CH=CH_2$; where $n_{avg}=9$

Cationogenic Monomers

Cationogenic monomers of the present invention include, for example, acrylate esters of the formula III

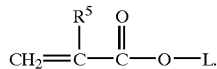

(III)

With reference to Formula III, L designates a cationogenic group. The polymeric fluorochemical polymers of the invention contain a plurality of pendent cationogenic groups (e.g. from 4 to 10). Each cationogenic group preferably contains at least 3 carbon atoms, more preferably 3 to 20 carbon atoms, and most preferably 4 to 8 carbon atoms. Additionally, each cationogenic group optionally contains oxygen, nitrogen, or sulfur groups or a combination thereof. L includes dialkylaminoalkyl moieties, in either the free base or amine salt form, as well as quaternary ammonium and amine oxide moieties.

L is $—(C_qH_{2q})—Y$, and salts thereof, including an onium moiety of the Formula V

(V)

q is 1 to 8; Y is a cationogenic group such as, for example, the pyridinium ion, phosphonium ion, sulfonium ion, or $N(R^8)_3$ where each $R^8$ is independently H, or C1–C4 alkyl, or where any two of $R^8$ combine to from an alkylene moiety having 4 to 5 chain carbon atoms, or any two of $R^8$ are $—CH_2CH_2—$ and combine with an oxygen atom to form the moiety $—CH_2CH_2—O—CH_2CH_2—$. $X^-$ is a water-solubilizing anion and is includes alkyl sulfate ions such as, for example, $CH_3OSO_3^-$, and the halide ions such as, for example, $Cl^-$, $Br^-$, $F^-$, and $I^-$. Additional examples of quaternary ammonium moieties of the Formula V include those where q is 1 to 4 and each $R^8$ is independently $C_1$–$C_4$ alkyl. Further examples of quaternary ammonium moieties of the Formula V include those where q is 2 and each $R^8$ is independently $C_1$ alkyl.

In one example, L is a dialkylaminoalkyl moiety of the Formula IV

(IV)

where q is 1 to 8, and $R^6$ and $R^7$ are independently $C_1$–$C_{12}$ alkyl or $C_1$–$C_{12}$ hydroxyalkyl. Additional examples of dialkylaminoalkyl moieties of the Formula IV include those where q is ito 4 and $R^6$ and $R^7$ are independently $C_1$–$C_4$ alkyl. Further examples of dialkylaminoalkyl moieties of the Formula IV include those where q is 2 and $R^6$ and $R^7$ are each $C_1$ alkyl.

In a further example, L is an amine oxide moiety of the Formula VI

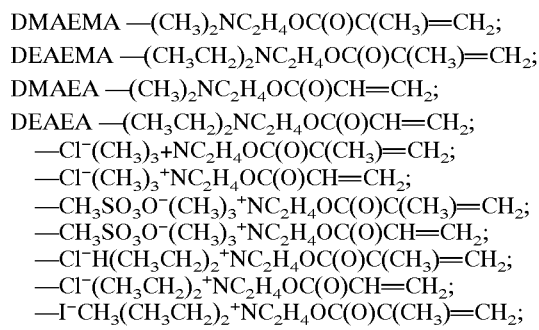

(VI)

where q is 1 to 8, and $R^9$ and $R^{10}$ are independently $C_1$–$C_{12}$ alkyl or $C_1$–$C_{12}$ hydroxyalkyl. Additional examples of amine oxide moieties of the Formula VI include those where q is 1 to 4 and $R^9$ and $R^{10}$ are independently $C_1$–$C_4$ alkyl. Further examples of amine oxide moieties of the Formula VI include those where q is 2 and $R^9$ and $R^{10}$ are each $CH_3$.

With reference to Formula III, $R^5$ includes hydrogen or methyl.

Examples of cationogenic monomers include the following:

DMAEMA  $—(CH_3)_2NC_2H_4OC(O)C(CH_3)=CH_2$;
DEAEMA  $—(CH_3CH_2)_2NC_2H_4OC(O)C(CH_3)=CH_2$;
DMAEA  $—(CH_3)_2NC_2H_4OC(O)CH=CH_2$;
DEAEA  $—(CH_3CH_2)_2NC_2H_4OC(O)CH=CH_2$;
 $—Cl^-(CH_3)_3{+}NC_2H_4OC(O)C(CH_3)=CH_2$;
 $—Cl^-(CH_3)_3{+}NC_2H_4OC(O)CH=CH_2$;
 $—CH_3SO_3O^-(CH_3)_3{+}NC_2H_4OC(O)C(CH_3)=CH_2$;
 $—CH_3SO_3O^-(CH_3)_3{+}NC_2H_4OC(O)CH=CH_2$;
 $—Cl^-H(CH_3CH_2)_2{+}NC_2H_4OC(O)C(CH_3)=CH_2$;
 $—Cl^-(CH_3CH_2)_2{+}NC_2H_4OC(O)CH=CH_2$;
 $—I^-CH_3(CH_3CH_2)_2{+}NC_2H_4OC(O)C(CH_3)=CH_2$;

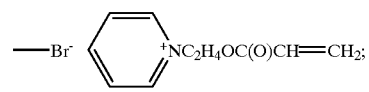

$—O{\leftarrow}N(CH_3)_2C_2H_4OC(O)C(CH_3)=CH_2$; and
 $—(CH_3)_2N(CH_2)_3N(H)C(O)CH=CH_2$.

N-Hydroxyalkylacrylamide Monomers

N-Hydroxyalkylacrylamide monomers of the present invention include, for example, monomers of the formula VII

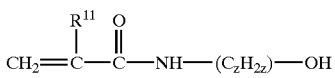

(VII)

where z is 1 to 12, and $R^{11}$ includes, for example, hydrogen or $C_1$–$C_{12}$ alkyl. In an additional example, z is 1 to 6, and $R^{11}$ includes hydrogen or methyl.

Examples of N-hydroxyalkylacrylamides monomers include the following:

—HOCH$_2$HNC(O)CH=CH$_2$.

Diacrylate Monomers

Diacrylate monomers of the present invention include, for example, monomers of the formula VIII

(VIII)

where $R^{12}$ includes H or CH$_3$—, and $R^{13}$ includes —(CH$_2$CH$_2$O)$_p$—, where p is 1 to 25. In an additional example, $R^{12}$ is H and p is 1 to 20. In a further example, p is 5 to 15.

Examples of diacrylate monomers include the following:

CW-400-Diacrylate—CH$_2$=CHC(O)O(C$_2$H$_4$O)$_n$C(O)CH=CH$_2$; where $n_{avg}$=9.

Synthesis

The fluorochemical polymers of the present invention can be prepared by the polymerization of compounds of the Formula I, II, III, and either VII or VIII in the presence of a free-radical initiator using solvent polymerization techniques known to those of skill in the art.

The fluorochemical polymers of the present invention can be prepared in any solvent suitable for organic free-radical reactions. The reactants can be present in the solvent at any suitable concentration, e.g., from about 5 percent to about 90 percent by weight based on the total weight of the reaction mixture. Examples of suitable solvents include aliphatic and alicyclic hydrocarbons (e.g., hexane, heptane, cyclohexane), aromatic solvents (e.g., benzene, toluene, xylene), ethers (e.g., diethylether, glyme, diglyme, diisopropyl ether), esters (e.g., ethyl acetate, butyl acetate), alcohols (e.g., ethanol, isopropyl alcohol), ketones (e.g., acetone, methyl ethyl ketone, methyl isobutyl ketone), sulfoxides (e.g., dimethyl sulfoxide), amides (e.g., N,N-dimethylformamide, N,N-dimethylacetamide), halogenated solvents such as methylchloroform, FREON™113, trichloroethylene, α,α,α.-trifluorotoluene, fluorinated ethers such as C$_4$F$_9$OCH$_3$ and the like, and mixtures thereof.

Additionally, any conventional free-radical catalyst which is soluble in the solvent system can be used. Free-radical catalysts include those any of the conventional compounds such as, for example, organic azo compounds, organic peroxides (e.g., diacyl peroxides, peroxyesters, and dialkyl peroxides) that provide initiating radicals upon homolysys. Free-radical catalysts include persulfates, azo compounds such as azo bis(isobutyronitrile) and azo-2-cyanovaleric acid and the like, hydroperoxides such as cumene, t-butyl and t-amyl hydroperoxide, dialkyl peroxides such as di-t-butyl and dicumyl peroxide, peroxyesters such as t-butyl perbenzoate and di-t-butylperoxy phthalate, diacylperoxides such as benzoyl peroxide and lauroyl peroxide. A suitable amount of free-radical catalyst depends on the particular catalyst and other reactants being used. About 0.1 percent to about 5 percent, preferably about 0.1 percent, to about 0.8 percent, and most preferably about 0.2 percent to 0.5 percent by weight of a catalyst can be used, based on the total weight of all other reactants in the reaction.

The fluorochemical polymers of the present invention can alternatively be prepared in the presence of a free-radical initiator and a chain transfer catalyst using solvent polymerization techniques known to those of skill in the art. Either functionalized or non-functionalized chain-transfer agents can be used.

Functionalized chain-transfer agents are those that contain a group capable of terminating a radical chain reaction (e.g., a sulfhydryl) yet include further functional groups capable of reacting with nucleophiles, electrophiles, or capable of undergoing displacement reactions. The nature of the functional groups on both the chain transfer agent and the monomers are chosen so that they are reactive toward one another. Examples of mutually reactive pairs include an acyl group (such as a carboxylic acid, acyl halide or ester) reacting with an alcohol or amine, an alcohol or an amine reacting with a "leaving group" such as a halide or tosylate, and an isocyanate reacting with an alcohol or anine. Suitable functional groups for inclusion in the chain-transfer agent include hydroxy, amino, halo, epoxy, haloformyl, aziridinyl, acid groups and salts thereof, which react with an electrophile or nucleophile, or are capable of further transformation into such groups. Examples of such functionalized chain transfer agents include, 2-mercaptoethanol, mercaptoacetic acid, 2-mercaptobenzimidazole, 2-mercaptobenzoic acid, and 2-mercaptobenzothiazole.

Non-functionalized chain-transfer agents are those that contain a group capable of terminating a radical chain reaction (e.g., a sulfhydryl) but no further functional groups capable of reacting with nucleophiles, electrophiles, or capable of undergoing displacement reactions. Examples of such non-functionalized chain transfer agents include mono, di, and polythiols such as ethanethiol, propanethiol, butanethiol, hexanethiol, n-octylthiol, t-dodecylthiol, 2-mercaptoethyl ether, and 2-mercaptoimidazole.

Whether functionalized or not, a chain transfer agent may be present in an amount sufficient to control the number of polymerized monomer units in the oligomer. Conventional chain transfer agents useful in the synthesis of the compounds of the present invention include, for example, dodecylmercaptan and isooctyl thioglycolate in amounts of 0.1 percent to 5 percent, 0.1 percent to 2 percent, or 0.2 percent to 0.5 percent by weight of a catalyst can be used, based on the total weight of all other reactants in the reaction.

Weight ratios of the monomers of the polymeric fluorochemical compounds of the present invention, based on the total weight of the polymer include those, for example, from 20 to 70 percent by weight of a perfluoroaliphatic monomer of the Formula I, from 25 to 60 percent by weight of a hydrophilic monomer of the Formula II, from 1 to 20 percent by weight of a cationogenic monomer of the formula III, and/or 1 to 10 percent by weight of a hydroxyalkylamide monomer of the formula VII, or 0.001 to 5 percent by weight of a diacrylate monomer of the formula VIII.

In one example, weight ratios of the monomers of the polymeric fluorochemical polymers of the present invention, based on the total weight of the polymer are from 45 to 70 percent by weight of a perfluoroaliphatic monomer of the Formula I, from 25 to 50 percent by weight of a hydrophilic monomer of the Formula II, from 1 to 10 percent by weight of a cationogenic monomer of the formula III, and from 1 to 8 percent by weight of a hydroxyalkylamide monomer of the formula VII.

In a further example, weight ratios of the monomers of the polymeric fluorochemical polymers of the present invention, based on the total weight of the polymer are from 45 to 65 percent by weight of a perfluoroaliphatic monomer of the Formula I, from 30 to 50 percent by weight of a hydrophilic monomer of the Formula II, from 1 to 10 percent by weight of a cationogenic monomer of the formula III, and from 0.01 to 2 percent by weight of a diacrylate monomer of the formula VIII.

In an additional example, weight ratios of the monomers of the polymeric fluorochemical polymers of the present invention, based on the total weight of the polymer are 50 to 65 percent by weight of a perfluoroaliphatic monomer of the Formula I, 35 to 40 percent by weight of a hydrophilic monomer of the Formula II, 1 to 5 percent by weight of a cationogenic monomer of the formula III, and 1 to 5 percent by weight of a hydroxyalkylamide monomer of the formula VII.

In yet a further example, weight ratios of the monomers of the polymeric fluorochemical polymers of the present invention, based on the total weight of the polymer are 50 to 60 percent by weight of a perfluoroaliphatic monomer of the Formula I, 35 to 45 percent by weight of a hydrophilic monomer of the Formula II, 1 to 5 percent by weight of a cationogenic monomer of the formula III, and 0.1 to 1 percent by weight of a diacrylate monomer of the formula VIII.

EXAMPLES

Perfluoroaliphatic Monomers

TELOMER-A—FLUOWET™ AC-812 fluoroacrylate monomer, $(CH_2=CHC(O)OCH_2CH_2(CF_2)_nCF_3$, where n is a value ranging from 3 to 20 and averaging 8, available from Clariant Gmbh, Frankfurt, Germany).

(FLUOWET™-AC-600) $(C_6F_{13}C_2H_4OC(O)CH=CH_2)$ available from Clariant Gmbh, Frankfurt, Germany MeFOSEA—$C_8F_{17}SO_2N(CH_3)C_2H_4OC(O)CH=CH_2$, can be prepared using the general procedure described in U.S. Pat. No. 2,803,615.

EtFOSEA—$C_8F_{17}SO_2N(C_2H_5)C_2H_4OC(O)CH=CH_2$, can be prepared using the general procedure described in U.S. Pat. No. 2,803,615.

MeFBSEMA—$C_4F_9SO_2N(CH_3)C_2H_4OC(O)C(CH_3)=CH_2$, can be prepared using the general procedure described in U.S. Pat. No. 2,803,615.

MeFBSEA—$C_4F_9SO_2N(CH_3)CH_2CH_2OC(O)CH=CH_2$, can be prepared using the general procedure described in U.S. Pat. No. 2,803,615.

MeFOSEMA—$C_8F_{17}SO_2N(CH_3)C_2H_4OC(O)C(CH_3)=CH_2$, can be prepared by the general procedure described in U.S. Pat. No. 2,803,615.

FC-248—can be prepared by the general procedure described in U.S. Pat. No. 5,574,791.

C4-FC-248—can be prepared by the general procedure described in U.S. Pat. No. 5,574,791 by substituting MeFBSEA for MeFOSEA.

Hydrophilic Monomers

CW-750-A—$CH_3O(CH_2CH_2O)_{17}C(O)CH=CH_2$, can be prepared using the procedure described in Example 17 of U.S. Pat. No. 3,728,151.

Cationogenic Monomers

DMAEMA —$(CH_3)_2NC_2H_4OC(O)C(CH_3)=CH_2$;
DEAEMA —$(CH_3CH_2)_2NC_2H_4OC(O)C(CH_3)=CH_2$;
DMAEA —$(CH_3)_2NC_2H_4OC(O)CH=CH_2$;
DEAEA —$(CH_3CH_2)_2NC_2H_4OC(O)CH=CH_2$;
—Cl⁻$(CH_3)_3{}^+NC_2H_4OC(O)C(CH_3)=CH_2$;
—Cl⁻$(CH_3)_3{}^+NC_2H_4OC(O)CH=CH_2$;
—$CH_3SO_3O^-(CH_3)_3{}^+NC_2H_4OC(O)C(CH_3)=CH_2$;
—$CH_3SO_3O^-(CH_3)_3{}^+NC_2H_4OC(O)CH=CH_2$;
—Cl⁻H$(CH_3CH_2)_2{}^+NC_2H_4OC(O)C(CH_3)=CH_2$;
—Cl⁻H$(CH_3CH_2)_2{}^+NC_2H_4OC(O)CH=CH_2$;
—I⁻$CH_3(CH_3CH_2)_2{}^+NC_2H_4OC(O)C(CH_3)=CH_2$;

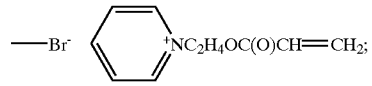

—O←$N(CH_3)_2C_2H_4OC(O)C(CH_3)=CH_2$; and
—$(CH_3)_2N(CH_2)_3N(H)C(O)CH=CH_2$.

N-Hydroxyalkylacrylamide Monomers

—$HOCH_2(H)NC(O)CH=CH_2$.

Diacrylate Monomers

CW-400-Diacrylate—$CH_2=C(H)C(O)O(C_2H_4O)_nC(O)C(H)=CH_2$; where $n_{avg}=9$.

Example 1

Preparation of MeFBSEA/CW-750-A/DMAEMA/ NMA in the Weight % Ratio of 60.0/35.012.5/2.5

A 250 mL glass bottle was charged with N-methylperfluorobutanesulfonamido ethylmethacrylate (MeFBSEA, 60.0 g; 0.15 mole; available from 3M, St Paul, Minn.), poly(ethylene oxide) monomethyl acrylate (CW-750-A; 35.0 g; 0.042 mole) available from 3M, St. Paul, Minn., dimethylaminoethyl methacrylate (DMAEMA; 2.50 g; 0.016 mole; available from Aldrich, Milwaukee, Wis.), N-hydroxymethylacrylamide (NMA; 5.20 g of 48% aqueous solution; 0.025 mole; available from Aldrich, Milwaukee, Wis.) and ethyl acetate (120 g; available from Aldrich, Milwaukee, Wis.). This mixture was shaken for approximately 1–2 minutes allowing the monomers to be dissolved in the ethyl acetate. Nitrogen was bubbled through the resulting solution for approximately 5 minutes upon which azo bis(isobutyronitrile) (AIBN; 1.0 g; 0.006 mole; available from Aldrich, Milwaukee, Wis.), was added and nitrogen bubbled through the solution for an additional 1 minute. The bottle containing the solution was then capped and allowed to rotate in the Launder-Ometer™, available from Atlas Electric Devices Co., Chicago, Ill., at 70° C. for 12–15 h. Upon removal from the Launder-Ometer™ the solution was stirred and a mixture of acetic acid (0.95 g) and 200 mL warm water was added. The ethyl acetate was evaporated from the solution using a Rotavaporm Model EL-131 (available from Buchi, Switzerland). The ensuing latex product obtained had an appearance from milky white to translucent.

Example 2

Preparation of MeFBSEA/CW-750-A/DMAEMA/ NMA in the Weight % Ratio of 52.0/44.012.0/2.0

The procedure in Example 1 was followed with the exception that the weights of the following materials were substituted:

MeFBSEA, 52.0 g; 0.13 mole; available from 3M, St Paul, Minn.),
CW-750-A; 44.0 g; 0.052 mole
DMAEMA; 2.00 g; 0.013 mole
NMA; 4.17 g of 48% aqueous solution; 0.020 mole.
Acetic Acid; 0.76 g

Example 3

Preparation of AC-600/CW-750-A/DMAEMAINMA in the Weight Ratio of 60.0135.0/2.5/2.5

The procedure in Example 1 was followed with the exceptions that the following material substitutions were made:
AC-600 (60.0 g, 0.14 mole; available from Clariant Gmbh, Frankfurt, Germany) in place of MeFBSEA and that the weights of the following materials were substituted:
CW-750-A; 35.0 g; 0.042 mole
DMAEMA; 2.50 g; 0.016 mole
NMA; 5.20 g of 48% aqueous solution; 0.025 mole.

Example 4

Preparation of MeFBSEA/CW-750-A/DMAEMA in the Weight % Ratio of 54.0/44.0/2.0

The procedure in Example 1 was followed with the exception that the weights of the following materials were substituted:
MeFBSEA, 54.0 g; 0.13 mole
CW-750-A; 44.0 g; 0.052 mole
DMAEMA; 2.00 g; 0.013 mole
Acetic Acid; 0.76 g;
and NMA was eliminated from the composition.

Example 5

Preparation of CW-750-A+CW-400 Diacrylate Monomer Mixture from CW-750™ Monofunctional Alcohol and CW-400™ Difunctional Alcohol in the Weight Ratio of 98/2

To a 1 L round bottom flask fitted with a heating mantle, Dean-Stark trap (filled with toluene, available from Aldrich, Milwaukee, Wis. to the arm), a condenser, a mixer and thermometer was added poly(ethylene oxide) monomethyl ether (CARBOWAX 750™, 228.53 g) available from Union Carbide, Danbury Conn., and CARBOWAX™ 400 (4.66 g) available from Union Carbide, Danbury, Conn. Heat was slowly applied to melt the CARBOWAX mixture and a solution of phenothiazine (0.1181 g; $6\times10^{-4}$) available from Aldrich, Milwaukee, Wis., in approximately 115.0 g of toluene, is added to the melt. The resulting mixture was further heated and upon addition of a suspension of p-toluenesulfonic acid (9.52 g; 0.05 mole) available from Aldrich, Milwaukee, Wis., and acrylic acid (27.45 g, 0.38 mole) available from Aldrich, Milwaukee, Wis., in approximately 115.0 g of toluene, the content of the round bottom flask turned brown. The ensuing mixture is heated at reflux temperature (approximately 120° C.) for six hours. During this reflux time, about 6 mL of water were collected in the Dean-Stark trap. Upon cooling the reaction mixture to 65° C. calcium hydroxide (9.52 g, moles) was slowly added to the stirred mixture and the mixture was allowed to stir for 15 minutes after the addition. This mixture was then filtered, resulting in a translucent, brown filtrate to which was added phenothiazine (0.07 g, $3.5\times10^{-4}$ mole). The filtrate was put onto a Rotavapor™ with a heating bath set at 90° C. to evaporate toluene (typically 170–230 g) from the mixture. The resulting material is a mixture of

CW-750-A:

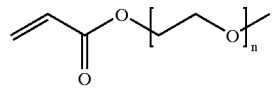

Where $n_{avg}=16$
and
CW-400 diacrylate:

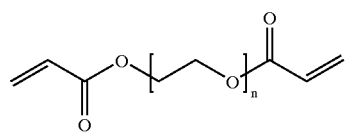

Where $n_{avg}=9$

Example 6

Preparation of CW-2000A

The procedure in Example 5 was followed with the exception that the following material substitutions were made:
CW-2000™ (available from Union Carbide, Danbury, Conn.) in place of CW-750 and CW-400.

Example 7

Preparation of MeFBSEA/CW-750-A+CW-400 Diacrylate/DMAEMA in the Weight Ratio of 52.5/45/2.5

The procedure in Example 1 was followed with the exception that the following material substitution was made:
CW-750-A+CW-400 diacrylate (45.0 g, 0.022 mole; 98/2 mixture see example 5) in place of CW-750A
the weights of the following materials were substituted:
MeFBSEA, 52.5 g; 0.13 mole
DMAEMA; 2.50 g; 0.016 mole
and NMA was eliminated from the composition.

Example 8

Preparation of MeFBSEA/CW-2000A/DMAEMA in the Weight % Ratio of 52.5/45.0/2.5

The procedure in Example 1 was followed with the exception that the following material substitutions were made:
CW-2000A (45.0 g, 0.022 mole; see Example 6) in place of CW-750A
the weights of the following materials were substituted:
MeFBSEA, 52.0 g; 0.13 mole
DMAEMA; 2.50 g; 0.016 mole
and NMA was eliminated from the composition.

Example 9

Preparation of MeFBSEA/CW-450-A/DMAEMA in the Weight % Ratio of 52.5/45.0/2.5

The procedure in Example 1 was followed with the exception that the following ial substitutions were made:

CW-450-A (45.0 g, 0.084 mole; available from Aldrich, Milwaukee, Wis.) in place of CW-750-A the weights of the following materials were substituted:

MeFBSEA, 52.0 g; 0.13 mole

DMAEMA; 2.50 g; 0.016 mole and NMA was eliminated from the composition.

TABLE 1

| Composition | | Initial Stain Release | | | | 5 Launderings Stain Release | | |
|---|---|---|---|---|---|---|---|---|
| No. | (Wt % Ratios) | K | E | C | O/R | K | E | C |
| C1 | FC-248 | 7 | 7 | 6 | 5 | 7 | 7 | 6 |
| C2 | C4-FC-248 | 7 | 6.5 | 4 | 2 | 4 | 4 | 4 |
| 1 | MeFBSEA/CW-750A/DMAEMA (52.5/45/2.5) | 6.5 | 7 | 6 | 2 | 6.5 | 6.5 | 5.5 |
| 2 | MeFBSEA/CW-750-A + CW-400Diacrylate/DMAEMA (52/45.5/2.5) | 7 | 7.5 | 6.5 | 2 | 6.5 | 7 | 6.5 |
| 3 | MeFBSEA/CW-2000A/DMAEMA (52.5,45,2.5) | 6.5 | 6.5 | 5 | 0 | 5.5 | 5.5 | 4 |
| 4 | MeFBSEA/CW-750A/DMAEMA (54/44/2) | 6 | 6 | 6.5 | 2 | 7 | 7 | 6.5 |
| 5 | MeFBSEA/CW-450A/DMAEMA (54/44/2) | 6 | 6 | 6.5 | 0 | 6.5 | 6.5 | 6 |

Table 1 lists the initial stain release and oil resistance, and also stain release data five launderings. The comparative example (Table 1, Nos. C1 and C2) show that an equivalent weight substitution of perfluorooctane sulfonamide ethylacrylate (Table 1, No. C1) with perfluorobutane sulfonamide ethylacrylate (Table 1, No. C2) exhibited poorer initial oil resistance, poorer initial stain release and also poorer stain release after 5 launderings. Addition of CW-400 Diacrylate (Table 1, No. 2; see Example 7) improves the initial stain release ratings of treated fabric over the comparative fabric sample with no CW-400 Diacrylate (Table 1, No. 1). Addition of CW-400 Diacrylate (Table 1, No. 2; see Example 7) also maintains or improves the five laundering stain release ratings of treated fabric over the comparative fabric sample with no CW-400 Diacrylate (Table 1, No. 1).

Of samples treated with polymers containing different molecular weight poly(ethylene oxide) chains (Table 1 Nos. 3, 4 and 5), the CW-750A containing sample (Table 1 No. 4; see Example 4) exhibited the best stain release data after five launderings, and best initial oil resistance (O/R).

TABLE 2A

| | | Initial | | | | | 5 Launderings | | | | | |
|---|---|---|---|---|---|---|---|---|---|---|---|---|
| No. | Composition (Wt % Ratios) | K | E | C | O/R | Absorption time (sec) | K | E | C | O/R | Absorption time (sec) | % F Retained |
| 1 | MeFBSEA/CW-750A/DMAEMA (60/35/5) | 7.5 | 7 | 6.5 | 5 | >30 | 6.5 | 6.5 | 5 | 0 | 7 | 32 |
| 2 | MeFBSEA/CW-750A/DMAEMA/NMA (60/35/2.5/2.5) | 7.5 | 7 | 7 | 5 | >30 | 7.5 | 7.5 | 6.5 | 1 | >30 | 42 |
| 3 | MeFBSEA/CW-750A/DMAEMA/NMA (60/35/1.0/4.0) | 7.5 | 7.5 | 7 | 5 | >30 | 7.5 | 8 | 7 | 1 | >30 | 62 |
| 4 | MeFBSEA/CW-750A/DMAEMA (54/44/2) | 7 | 8 | 6.5 | 5 | 30 | 6.5 | 7 | 4.5 | 0 | 11 | 20 |
| 5 | MeFBSEA/CW-750A/DMAEMA/NMA (52/44/2/2) | 8 | 8 | 7 | 4 | >30 | 7.5 | 7 | 6.5 | 1 | >30 | 32 |
| 6 | AC600/CW-750A/DMAEMA (60/35/5) | 7 | 7.5 | 6.5 | 4 | 16 | 6 | 6.5 | 6 | 0 | 6 | 25 |
| 7 | AC600/CW-750A/DMAEMA/NMA (60/35/2.5/2.5) | 7 | 7.5 | 6.5 | 4 | >30 | 6.5 | 6.5 | 6 | 1 | >30 | 49 |

TABLE 2B

| | | 10 Launderings | | | | | | 20 Launderings | | | | | |
|---|---|---|---|---|---|---|---|---|---|---|---|---|---|
| No. | Composition (Wt % Ratios) | K | E | C | O/R | Absorption time (sec) | % F Retained | K | E | C | O/R | Absorption time (sec) | % F Retained |
| 1 | MeFBSEA/CW-750A/DMAEMA (60/35/5) | 6 | 6 | 6 | 0 | 4 | 28 | 6 | 6 | 6 | 0 | 3 | 22 |

TABLE 2B-continued

| | | 10 Launderings | | | | | 20 Launderings | | | | | |
|---|---|---|---|---|---|---|---|---|---|---|---|---|
| No. | Composition (Wt % Ratios) | K | E | C | O/R | Absorption time (sec) | % F Retained | K | E | C | O/R | Absorption time (sec) | % F Retained |
| 2 | MeFBSEA/CW-750A/DMAEMA/NMA (60/35/2.5/2.5) | 6.5 | 7 | 5.5 | 0 | 30 | 34 | 6.5 | 6.5 | 5 | 0 | 30 | 29 |
| 3 | MeFBSEA/CW-750A/DMAEMA/NMA (60/35/1.0/4.0) | 7 | 6.5 | 6 | 0 | 30 | 38 | 7 | 8 | 6.5 | 0 | 30 | 40 |
| 4 | MeFBSEA/CW-750A/DMAEMA (54/44/2) | 6 | 6.5 | 4.5 | 0 | 2 | 20 | 6 | 6.5 | 4.5 | 0 | 2 | 21 |
| 5 | MeFBSEA/CW-750A/DMAEMA/NMA (52/44/2/2) | 6.5 | 7 | 6 | 0 | 30 | 25 | 6.5 | 6.5 | 6 | 0 | 16 | 18 |
| 6 | AC600/CW-750A/DMAEMA (60/35/5) | 6 | 6.5 | 6 | 0 | 7 | 22 | 6 | 6.5 | 5.5 | 0 | 7 | 22 |
| 7 | AC600/CW-750A/DMAEMA/NMA (60/35/2.5/2.5) | 6.5 | 6.5 | 6.5 | 0 | 29 | 35 | 6.5 | 7 | 5.5 | 0 | 14 | 35 |

Tables 2A and 2B list the initial stain release, initial oil resistance, initial absorption data and also stain release, oil resistance absorption times and % Fluorine (%F) retained on the fabric after five, ten and twenty launderings. After 5 launderings, the fabric samples treated with compositions containing NMA (Table 2A, Nos. 2, 3, 5 and 7) resulted in higher oil resistance ratings and improved stain release ratings than the comparative samples which contained no NMA (Table 2A, No. 1, 4, and 6). After 20 launderings, the fabric samples treated with compositions containing NMA (Table 2B, Nos. 2, 3, 5 and 7) resulted in longer absorption times and stain release ratings than the comparative sample that contained no NMA (Table 2B, No. 1, 4 and 6). Compositions containing NMA (Tables 2A and 2B, No. 2, 3, 5 and 7) generally exhibit higher % F retained values than comparative compositions containing no NMA (Tables 2A and 2B, No. 1, 4 and 6).

TABLE 3

| No. | MeFBSEA/CW-750A/DMAEMA/NMA | % Solids | Viscosity |
|---|---|---|---|
| 1 | 65/35/0/0 | 15 | Honey-like |
| 2 | 65/33/0/2 | 21 | Honey-like |
| 3 | 50/50/0/0 | 25 | Water-like |
| 4 | 60/35/2.5/2.5 | 15 | Water-like |
| 5 | 64/34/2/0 | 25 | Water-like |

Qualitative viscosity observations listed in Table 3 show that formulations at solids ≧15%, with high MeFBSEA (>60%) requires DMAEMA to achieve water-like viscosity which allows for economical conveyance and convenient transfer of aqueous polymer solutions in manufacturing operations.

APPLICATION & TESTING OF COMPOSITIONS

Application of Compositions to Polyester/Cotton Fabric

A 65% polyester, 35% cotton twill fabric was dipped into a bath of the diluted polymer and immediately sent through a nip. The concentration of the bath is adjusted to produce a fabric that when dry had a fluorochemical solids coating at 0.4% or 1.0% of the fabric total weight. The bath also contained either a glyoxal-type resin, Permafresh™ ULF (Omnova Solutions, Inc.), and a citric acid activated magnesium chloride catalyst, Catalyst 531™ (Omnova Solutions, Inc.) or a pre-catalyzed resin, Permafresh™ EFC (Omnova Solutions, Inc.), a nonionic surfactant, Pat-Wet LF-55 (Yorkshire Pat-Chem Inc.), at 0.1% to 0.3% on the weight of the bath, and either a silicone emulsion, Siltouch SRS™ (Yorkshire Pat-Chem Inc.), at 2% on the weight of the bath, or a polyolefin emulsion, Pat-Soft PHD (Yorkshire Pat-Chem Inc.), at 2% on the weight of the bath. The fabric was dried and cured for 10 minutes at 150C. A number of performance tests were run on the fabric.

Performance Test—Oil Repellency

This test measures the resistance of the treated fabric to oil-based insults. A drop of one standard surface tension fluid (of a series of 8, with decreasing surface tensions) is dropped on a treated fabric. If after thirty seconds there is no wetting, the next highest standard number fluid (next lowest surface tension) is tested. When the lowest number fluid soaks into the fabric, the next lower number is the rating. For example, the fabric will receive a three rating, if the number four fluid wets the fabric. A more detailed description of the test is written in the 3M Protective Material Division's "Oil Repellency Test I" method (Document #98-0212-0719-0).

Performance Test—Oil Repellency—Durability

The Oil Repellency Test was run on treated fabric that had subsequently been washed in 5, 10, or 20, consecutive launderings, followed by tumble drying, as described in the 3M Protective Materials Division "Laboratory Laundering Procedures" for home laundering simulation (Document #98-0212-0703-4).

Performance Test—Stain Release

This test evaluates the release of forced-in oil-based stains from the treated fabric surface during simulated home laundering. Five drops of mineral oil, Stain K (Kaydol, Witco Chemical Co.) are dropped onto the fabric surface in a single puddle, a separate puddle of 5 drops of corn oil, Stain E, are dropped onto the fabric and another puddle of five drops of motor oil mixed with standard dirt, Stain C, are dropped onto the fabric. The puddles are covered with glassine paper, and weighted with a five-pound weight each for 60 seconds. The weights and glassine paper are removed from the fabric. The fabric sample is hung for 15–60 minutes, and then washed and dried. Samples are evaluated against a rating board, and assigned a number from 1 to 8. An 8 represents total removal of the stain, where 1 is a very dark stain. A more detailed description of the test is written in the 3M Protective Material Division's "Stain Release Test I" method (Document #98-0212-0725-7).

Performance Test—Stain Release—Durability

The Stain Release Test was run on treated fabric that had subsequently been washed in 5, 10, or 20, consecutive launderings, followed by tumble drying, as described in the 3M Protective Material Division's "Laboratory Laundering Procedures" (Document #98-0212-0703-4).

Performance Test—Fabric Absorbency

This test provides a rough index of fabric absorbency. A drop of water is placed on the fabric surface, and the amount of time it takes for that drop to absorb into the fabric leaving a matte, wet surface, is recorded. A more detailed description of the test is written in the 3M Protective Material Division's "Fabric Absorbency Test" method. This value of "absorbency time" is also referred to as the "wicking time." (Document #98-0212-0710-9).

Fluorine Analysis—Combustion Test

This test is designed to determine the amount of fluorine present on a substrate using combustion techniques.

Ignition Basket Assembly: Two 18 gauge platinum wires are inserted through a #9 rubber stopper allowing ¼ inch of each wire to protrude on one side of the stopper, to facilitate attachment of the power supply, and six inches of each wire to protrude on the other side of the rubber stopper. The six inch lengths are attached to opposite ends of a 45 mesh platinum sample cylinder (length=1 inch; circumference=1½ inches).

Procedure: Weigh 0.10 to 0.12 grams of fabric substrate and place the sample into the sample cylinder of the ignition basket assembly. Pipet 15 mL of deionized water into a clean, dry 1 L polycarbonate flask. Purge the flask for 30 seconds with oxygen and immediately place the platinum electrode assembly into the flask, securing the stopper. Invert the flask and place it at a slight angle into a ring supported by a ring stand. Be sure that the sample does not get wet.

Attach the wires from the 10,000 volt power supply to the platinum electrodes. Turn the Variac™ on and turn the dial clockwise until the sample ignites. When the sample is completely burned, turn the Variac™ dial back to zero and detach the wires from the electrode. Remove the flask from the ring stand and shake for two minutes, making sure that the platinum cylinder is completely rinsed. Let the flask stand for 30 minutes, shaking occasionally.

Pipet 5 mL of the solution recovered from the combustion flask and 5 mL of total ionic strength adjustor buffer (TISB IV) buffer solution (84 mL concentrated HCl, 242 g tris (hydroxymethyl) amino methane, 230 g sodium tartrate, diluted to 1 liter with deionized water) into a clean 50 mL plastic beaker. Place the electrodes in the beaker (Model #94-09 Fluoride ion Electrode and Model #90-01 Single Junction Reference Electrode; available from Orion research Inc, Boston, Mass.), turn on stirrer and record the microgram reading after the instrument stabilizes. Rinse and dry electrodes and calculate the ppm concentration of fluoride ion ($F^-$) from the microgram reading as follows:

$$\frac{\text{Micrograms reading} \times 3}{\text{Sample weight (g)}} = \text{ppm } F^- \text{ in sample}$$

A more detailed description of the test is written in the 3M Protective Material Division's "Fluorine Analysis Combustion Test" method (Document #98-0212-0723-2; May 1999).

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the instant specification.

All publications, patents, and patent documents described herein are incorporated by reference as if fully set forth.

We claim:

1. A polymer comprising i) from 20 to 70 percent by weight of a monomer of the formula

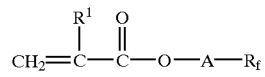

wherein $R_f$ is a perfluorinated group, $R^1$ is H or $CH_3$—, and

A is divalent linking group, ii) from 25 to 60 percent by weight of a monomer of the formula

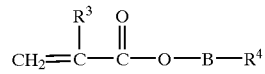

wherein

B is —$(CH_2CH_2O)_p$—, $R^3$ is H or $CH_3$—, p is 1 to 25, and $R^4$ is $C_1$–$C_{12}$ alkyl, aryl, aralkyl, or alkaryl;

iii) from 1 to 20 percent by weight of a monomer of the formula

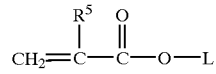

wherein $R^5$ is H or $CH_3$—;

L is —(CqH2q)—Y, wherein Y is a cationgenic group and salts thereof, and q is 1 to 8; and iv) 1 to 10 percent by weight of a monomer of the formula

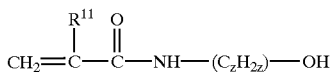

wherein
z is 1 to 12, and
$R^{11}$ is H or $CH_3$—; and/or v) 0.001 to 5 percent by weight of a monomer of the formula

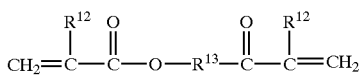

wherein
$R^{12}$ is H or $CH_3$—,
$R^{13}$ is —$(CH_2CH_2O)_p$—, and
p is 1 to 25.

2. A polymer according to claim 1 wherein monomer (i) is

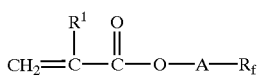

wherein
$R_f$ is a $C_3$–$C_8$ perfluorinated group,
A is $C_2$–$C_6$ alkylene or

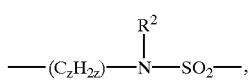

z is 1 to 6, and
$R^2$ is $CH_3$.

3. A polymer according to claim 1 wherein monomer (ii) is

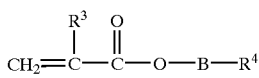

wherein
B is —$(CH_2CH_2O)_p$—,
$R^3$ is H,
p is 10 to 20, and
$R^4$ is $C_1$–$C_{12}$ alkyl.

4. A polymer according to claim 1 wherein monomer (iii) is

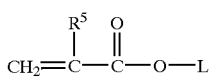

wherein
L is

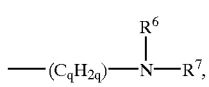

q is 1 to 4, $R^5$ is H or $CH_3$, and
$R^6$ and $R^7$ are independently $C_1$–$C_{12}$ alkyl.

5. A polymer according to claim 1 wherein monomer (iv) is

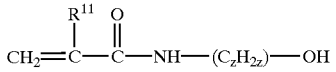

wherein
z is 1 to 6, and
$R^{11}$ is H.

6. A polymer according to claim 1 wherein monomer (v) is

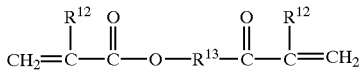

wherein
$R^{12}$ is H,
$R^{13}$ is —$(CH_2CH_2O)_p$—, and
p is 1 to 20.

7. A polymer according to claim 1 wherein monomer (i) is

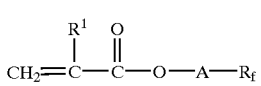

wherein
Rf is a $C_3$–$C_6$ perfluorinated group,
A is $C_2$–$C_4$ alkylene or

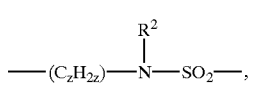

z is 2,
$R^1$ is H, and
$R^2$ is $CH_3$.

8. A polymer according to claim 1 wherein monomer (ii) is

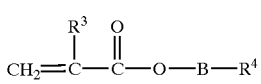

wherein
B is —$(CH_2CH_2O)_p$—,
$R^3$ is H,
p is 17, and
$R^4$ is $CH_3$.

9. A polymer according to claim 1 wherein monomer (iii) is

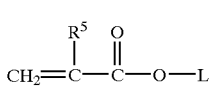

wherein

L is

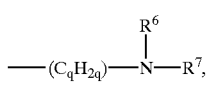

q is 2,
R⁵ is CH₃, and
R⁶ and R⁷ are CH₃.

10. A polymer according to claim 1 wherein monomer (iv) is

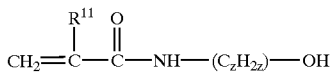

wherein z is 1, and
$R^{11}$ is H.

11. A polymer according to claim 1 wherein monomer (v) is

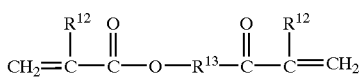

wherein $R^{12}$ is H,
$R^{13}$ is $-(CH_2CH_2O)_p-$, and
p is 5–15.

12. A polymer according to claim 1 wherein monomer (i) is

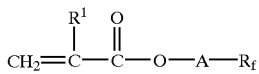

wherein $R_f$ is a $C_3$–$C_6$ perfluorinated group,
A is $C_2$–$C_4$ alkylene or

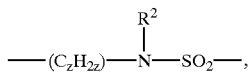

z is 2,
$R^1$ is H, and
$R^2$ is $CH_3$;
monomer (ii) is

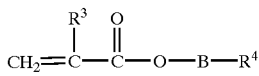

wherein

B is $-(CH_2CH_2O)_p-$,
$R^3$ is H,
p is 17, $R^4$ is $CH_3$;
monomer (iii) is

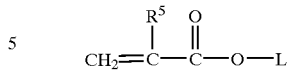

wherein

L is

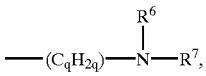

q is 2,
$R^5$ is $CH_3$, and
$R^6$ and $R^7$ are $CH_3$;
monomer (iv) is

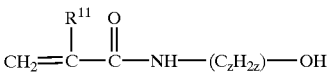

wherein z is 1; and
$R^{11}$ is H; and
monomer (v) is

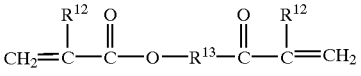

wherein $R^{12}$ is H;
$R^{13}$ is $-(CH_2CH_2O)_p-$; and
p is 5–15.

13. A polymer according to claim 1 wherein monomer (i) is present in the amount of 45 to 70 percent by weight, monomer (ii) is present in the amount of 25 to 50 percent by weight, monomer (iii) is present in the amount of 1 to 10 percent by weight, and monomer (iv) is present in the amount of 1 to 8 percent by weight.

14. A polymer according to claim 2 wherein monomer (i) is present in the amount of 45 to 70 percent by weight, monomer (ii) is present in the amount of 25 to 50 percent by weight, monomer (iii) is present in the amount of 1 to 10 percent by weight, and monomer (iv) is present in the amount of 1 to 8 percent by weight.

15. A polymer according to claim 3 wherein monomer (i) is present in the amount of 45 to 70 percent by weight, monomer (ii) is present in the amount of 25 to 50 percent by weight, monomer (iii) is present in the amount of 1 to 10 percent by weight, and monomer (iv) is present in the amount of 1 to 8 percent by weight.

16. A polymer according to claim 4 wherein monomer (i) is present in the amount of 45 to 70 percent by weight, monomer (ii) is present in the amount of 25 to 50 percent by weight, monomer (iii) is present in the amount of 1 to 10 percent by weight, and monomer (iv) is present in the amount of 1 to 8 percent by weight.

17. A polymer according to claim 5 wherein monomer (i) is present in the amount of 45 to 70 percent by weight, monomer (ii) is present in the amount of 25 to 50 percent by weight, monomer (iii) is present in the amount of 1 to 10 percent by weight, and monomer (iv) is present in the amount of 1 to 8 percent by weight.

18. A polymer according to claim 7 wherein monomer (i) is present in the amount of 45 to 70 percent by weight, monomer (ii) is present in the amount of 25 to 50 percent by weight, monomer (iii) is present in the amount of 1 to 10 percent by weight, and monomer (iv) is present in the amount of 1 to 8 percent by weight.

19. A polymer according to claim 8 wherein monomer (i) is present in the amount of 45 to 70 percent by weight, monomer (ii) is present in the amount of 25 to 50 percent by weight, monomer (iii) is present in the amount of 1 to 10 percent by weight, and monomer (iv) is present in the amount of 1 to 8 percent by weight.

20. A polymer according to claim 9 wherein monomer (i) is present in the amount of 45 to 70 percent by weight, monomer (ii) is present in the amount of 25 to 50 percent by weight, monomer (iii) is present in the amount of 1 to 10 percent by weight, and monomer (iv) is present in the amount of 1 to 8 percent by weight.

21. A polymer according to claim 10 wherein monomer (i) is present in the amount of 45 to 70 percent by weight, monomer (ii) is present in the amount of 25 to 50 percent by weight, monomer (iii) is present in the amount of 1 to 10 percent by weight, and monomer (iv) is present in the amount of 1 to 8 percent by weight.

22. A polymer according to claim 11 wherein monomer (i) is present in the amount of 45 to 70 percent by weight, monomer (ii) is present in the amount of 25 to 50 percent by weight, monomer (iii) is present in the amount of 1 to 10 percent by weight, and monomer (iv) is present in the amount of 1 to 8 percent by weight.

23. A polymer according to claim 12 wherein monomer (i) is present in the amount of 45 to 70 percent by weight, monomer (ii) is present in the amount of 25 to 50 percent by weight, monomer (iii) is present in the amount of 1 to 10 percent by weight, and monomer (iv) is present in the amount of 1 to 8 percent by weight.

24. A polymer according to claim 1 wherein monomer (i) is present in the amount of 50 to 65 percent by weight, monomer (ii) is present in the amount of 35 to 40 percent by weight, monomer (iii) is present in the amount of 1 to 5 percent by weight, and monomer (iv) is present in the amount of 1 to 5 percent by weight.

25. A polymer according to claim 2 wherein monomer (i) is present in the amount of 50 to 65 percent by weight, monomer (ii) is present in the amount of 35 to 40 percent by weight, monomer (iii) is present in the amount of 1 to 5 percent by weight, and monomer (iv) is present in the amount of 1 to 5 percent by weight.

26. A polymer according to claim 3 wherein monomer (i) is present in the amount of 50 to 65 percent by weight, monomer (ii) is present in the amount of 35 to 40 percent by weight, monomer (iii) is present in the amount of 1 to 5 percent by weight, and monomer (iv) is present in the amount of 1 to 5 percent by weight.

27. A polymer according to claim 4 wherein monomer (i) is present in the amount of 50 to 65 percent by weight, monomer (ii) is present in the amount of 35 to 40 percent by weight, monomer (iii) is present in the amount of 1 to 5 percent by weight, and monomer (iv) is present in the amount of 1 to 5 percent by weight.

28. A polymer according to claim 5 wherein monomer (i) is present in the amount of 50 to 65 percent by weight, monomer (ii) is present in the amount of 35 to 40 percent by weight, monomer (iii) is present in the amount of 1 to 5 percent by weight, and monomer (iv) is present in the amount of 1 to 5 percent by weight.

29. A polymer according to claim 7 wherein monomer (i) is present in the amount of 50 to 65 percent by weight, monomer (ii) is present in the amount of 35 to 40 percent by weight, monomer (iii) is present in the amount of 1 to 5 percent by weight, and monomer (iv) is present in the amount of 1 to 5 percent by weight.

30. A polymer according to claim 8 wherein monomer (i) is present in the amount of 50 to 65 percent by weight, monomer (ii) is present in the amount of 35 to 40 percent by weight, monomer (iii) is present in the amount of 1 to 5 percent by weight, and monomer (iv) is present in the amount of 1 to 5 percent by weight.

31. A polymer according to claim 9 wherein monomer (i) is present in the amount of 50 to 65 percent by weight, monomer (ii) is present in the amount of 35 to 40 percent by weight, monomer (iii) is present in the amount of 1 to 5 percent by weight, and monomer (iv) is present in the amount of 1 to 5 percent by weight.

32. A polymer according to claim 10 wherein monomer (i) is present in the amount of 50 to 65 percent by weight, monomer (ii) is present in the amount of 35 to 40 percent by weight, monomer (iii) is present in the amount of 1 to 5 percent by weight, and monomer (iv) is present in the amount of 1 to 5 percent by weight.

33. A polymer according to claim 11 wherein monomer (i) is present in the amount of 50 to 65 percent by weight, monomer (ii) is present in the amount of 35 to 40 percent by weight, monomer (iii) is present in the amount of 1 to 5 percent by weight, and monomer (iv) is present in the amount of 1 to 5 percent by weight.

34. A polymer according to claim 12 wherein monomer (i) is present in the amount of 50 to 65 percent by weight, monomer (ii) is present in the amount of 35 to 40 percent by weight, monomer (iii) is present in the amount of 1 to 5 percent by weight, and monomer (iv) is present in the amount of 1 to 5 percent by weight.

35. A polymer according to claim 1 wherein monomer (i) is present in the amount of 45 to 65 percent by weight, monomer (ii) is present in the amount of 30 to 50 percent by weight, monomer (iii) is present in the amount of 1 to 10 percent by weight, and monomer (v) is present in the amount of 0.01 to 2 percent by weight.

36. A polymer according to claim 2 wherein monomer (i) is present in the amount of 45 to 65 percent by weight, monomer (ii) is present in the amount of 30 to 50 percent by weight, monomer (iii) is present in the amount of 1 to 10 percent by weight, and monomer (v) is present in the amount of 0.01 to 2 percent by weight.

37. A polymer according to claim 3 wherein monomer (i) is present in the amount of 45 to 65 percent by weight, monomer (ii) is present in the amount of 30 to 50 percent by weight, monomer (iii) is present in the amount of 1 to 10 percent by weight, and monomer (v) is present in the amount of 0.01 to 2 percent by weight.

38. A polymer according to claim 4 wherein monomer (i) is present in the amount of 45 to 65 percent by weight, monomer (ii) is present in the amount of 30 to 50 percent by weight, monomer (iii) is present in the amount of 1 to 10 percent by weight, and monomer (v) is present in the amount of 0.01 to 2 percent by weight.

39. A polymer according to claim 6 wherein monomer (i) is present in the amount of 45 to 65 percent by weight, monomer (ii) is present in the amount of 30 to 50 percent by weight, monomer (iii) is present in the amount of 1 to 10 percent by weight, and monomer (v) is present in the amount of 0.01 to 2 percent by weight.

40. A polymer according to claim 7 wherein monomer (i) is present in the amount of 45 to 65 percent by weight, monomer (ii) is present in the amount of 30 to 50 percent by weight, monomer (iii) is present in the amount of 1 to 10 percent by weight, and monomer (v) is present in the amount of 0.01 to 2 percent by weight.

41. A polymer according to claim 8 wherein monomer (i) is present in the amount of 45 to 65 percent by weight, monomer (ii) is present in the amount of 30 to 50 percent by weight, monomer (iii) is present in the amount of 1 to 10 percent by weight, and monomer (v) is present in the amount of 0.01 to 2 percent by weight.

42. A polymer according to claim 9 wherein monomer (i) is present in the amount of 45 to 65 percent by weight, monomer (ii) is present in the amount of 30 to 50 percent by weight, monomer (iii) is present in the amount of 1 to 10 percent by weight, and monomer (v) is present in the amount of 0.01 to 2 percent by weight.

43. A polymer according to claim 10 wherein monomer (i) is present in the amount of 45 to 65 percent by weight, monomer (ii) is present in the amount of 30 to 50 percent by weight, monomer (iii) is present in the amount of 1 to 10 percent by weight, and monomer (v) is present in the amount of 0.01 to 2 percent by weight.

44. A polymer according to claim 11 wherein monomer (i) is present in the amount of 45 to 65 percent by weight, monomer (ii) is present in the amount of 30 to 50 percent by weight, monomer (iii) is present in the amount of 1 to 10 percent by weight, and monomer (v) is present in the amount of 0.01 to 2 percent by weight.

45. A polymer according to claim 12 wherein monomer (i) is present in the amount of 45 to 65 percent by weight, monomer (ii) is present in the amount of 30 to 50 percent by weight, monomer (iii) is present in the amount of 1 to 10 percent by weight, and monomer (v) is present in the amount of 0.01 to 2 percent by weight.

46. A polymer according to claim 1 wherein monomer (i) is present in the amount of 50 to 60 percent by weight, monomer (ii) is present in the amount of 35 to 45 percent by weight, monomer (iii) is present in the amount of 1 to 5 percent by weight, and monomer (v) is present in the amount of 0.01 to 1 percent by weight.

47. A polymer according to claim 2 wherein monomer (i) is present in the amount of 50 to 60 percent by weight, monomer (ii) is present in the amount of 35 to 45 percent by weight, monomer (iii) is present in the amount of 1 to 5 percent by weight, and monomer (v) is present in the amount of 0.1 to 1 percent by weight.

48. A polymer according to claim 3 wherein monomer (i) is present in the amount of 50 to 60 percent by weight, monomer (ii) is present in the amount of 35 to 45 percent by weight, monomer (iii) is present in the amount of 1 to 5 percent by weight, and monomer (v) is present in the amount of 0.1 to 1 percent by weight.

49. A polymer according to claim 4 wherein monomer (i) is present in the amount of 50 to 60 percent by weight, monomer (ii) is present in the amount of 35 to 45 percent by weight, monomer (iii) is present in the amount of 1 to 5 percent by weight, and monomer (v) is present in the amount of 0.1 to 1 percent by weight.

50. A polymer according to claim 6 wherein monomer (i) is present in the amount of 50 to 60 percent by weight, monomer (ii) is present in the amount of 35 to 45 percent by weight, monomer (iii) is present in the amount of 1 to 5 percent by weight, and monomer (v) is present in the amount of 0. 1 to 1 percent by weight.

51. A polymer according to claim 7 wherein monomer (i) is present in the amount of 50 to 60 percent by weight, monomer (ii) is present in the amount of 35 to 45 percent by weight, monomer (iii) is present in the amount of 1 to 5 percent by weight, and monomer (v) is present in the amount of 0.1 to 1 percent by weight.

52. A polymer according to claim 8 wherein monomer (i) is present in the amount of 50 to 60 percent by weight, monomer (ii) is present in the amount of 35 to 45 percent by weight, monomer (iii) is present in the amount of 1 to 5 percent by weight, and monomer (v) is present in the amount of 0.1 to 1 percent by weight.

53. A polymer according to claim 9 wherein monomer (i) is present in the amount of 50 to 60 percent by weight, monomer (ii) is present in the amount of 35 to 45 percent by weight, monomer (iii) is present in the amount of 1 to 5 percent by weight, and monomer (v) is present in the amount of 0.1 to 1 percent by weight.

54. A polymer according to claim 10 wherein monomer (i) is present in the amount of 50 to 60 percent by weight, monomer (ii) is present in the amount of 35 to 45 percent by weight, monomer (iii) is present in the amount of 1 to 5 percent by weight, and monomer (v) is present in the amount of 0.1 to 1 percent by weight.

55. A polymer according to claim 11 wherein monomer (i) is present in the amount of 50 to 60 percent by weight, monomer (ii) is present in the amount of 35 to 45 percent by weight, monomer (iii) is present in the amount of 1 to 5 percent by weight, and monomer (v) is present in the amount of 0.1 to 1 percent by weight.

56. A polymer according to claim 12 wherein monomer (i) is present in the amount of 50 to 60 percent by weight, monomer (ii) is present in the amount of 35 to 45 percent by weight, monomer (iii) is present in the amount of 1 to 5 percent by weight, and monomer (v) is present in the amount of 0.1 to 1 percent by weight.

\* \* \* \* \*

UNITED STATES PATENT AND TRADEMARK OFFICE
CERTIFICATE OF CORRECTION

PATENT NO.    : 6,482,911 B1
DATED         : November 19, 2002
INVENTOR(S)   : Jariwala, Chetan P.

It is certified that error appears in the above-identified patent and that said Letters Patent is hereby corrected as shown below:

Title page,
Item [56], References Cited, OTHER PUBLICATIONS,
"C.J. Brinker" reference, insert -- (1988) -- after "31-50".

Column 2,
Line 15, delete "$(C_qH_{29}q)$" and insert in place thereof -- $(C_qH_{2q})$ --.
Line 17, delete "$C_1$-$C_2$" and insert in place thereof -- $C_1$-$C_{12}$ --.

Column 6,
Line 38, insert -- — -- before "(FLUOWET™".

Column 7,
Line 10, delete "catemary" and insert in place thereof -- caternary --.

Column 8,
Line 23, delete "ito" and insert in place thereof -- 1 to --.
Line 53, delete "$+NC_2H_4$" and insert in place thereof -- $^+NC_2H_4$ --.

Column 9,
Line 1, delete "N-Hydroxyalkylacrylaniide" and insert in place thereof
-- N-Hydroxyalkylacrylamide --.

Column 10,
Line 29, delete "anine" and insert in place thereof -- amine --.

Column 11,
Line 13, delete "H" and insert in place thereof -- II --.

Column 12,
Line 33, delete "60.0/35.012.5/2.5" and insert in place thereof -- 60.0/35.0/2.5/2.5 --.
Line 64, delete "52.0/44.012.0/2.0" and insert in place thereof -- 52.0/44.0/2.0/2.0 --.

Column 13,
Line 11, delete "60.0135.0/2.5/2.5" and insert in place thereof -- 60.0/35.0/2.5/2.5 --.

Column 14,
Line 67, delete "ial" and insert in place thereof -- material --.

UNITED STATES PATENT AND TRADEMARK OFFICE
CERTIFICATE OF CORRECTION

PATENT NO. : 6,482,911 B1
DATED : November 19, 2002
INVENTOR(S) : Jariwala, Chetan P.

It is certified that error appears in the above-identified patent and that said Letters Patent is hereby corrected as shown below:

Column 16,
Line 14, insert -- after -- before "five".

Signed and Sealed this

Sixteenth Day of August, 2005

JON W. DUDAS
*Director of the United States Patent and Trademark Office*